（12） United States Patent
Amidon et al.

(10) Patent No.: US 9,660,430 B2
(45) Date of Patent: May 23, 2017

(54) CONFIGURABLE ENCLOSURE

(71) Applicant: PPC Broadband, Inc., East Syracuse, NY (US)

(72) Inventors: Jeremy Amidon, Marcellus, NY (US); Shawn Chawgo, Cicero, NY (US); Michael E. Lawrence, Syracuse, NY (US); Noah P. Montena, Syracuse, NY (US); Christopher P. Natoli, Fulton, NY (US); Chad T. Wells, Highlands Rach, CO (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

(21) Appl. No.: 14/611,710

(22) Filed: Feb. 2, 2015

(65) Prior Publication Data

US 2015/0144623 A1    May 28, 2015

Related U.S. Application Data

(63) Continuation of application No. 13/074,644, filed on Mar. 29, 2011, now Pat. No. 8,944,267.

(51) Int. Cl.
*H02G 3/14* (2006.01)
*H02G 3/08* (2006.01)

(52) U.S. Cl.
CPC .............. *H02G 3/083* (2013.01); *H02G 3/14* (2013.01)

(58) Field of Classification Search
CPC ............ E04G 15/061; E03F 5/02; H02G 3/14
USPC .................. 220/3.7, 3.8, 3.94, 4.02, 495.05; 174/562, 561, 560, 559; 428/423, 124; 215/254, 256
See application file for complete search history.

(56) References Cited

U.S. PATENT DOCUMENTS

| | | | | |
|---|---|---|---|---|
| 3,877,601 A | * | 4/1975 | Evans ................... | H02G 3/081 220/3.3 |
| 4,467,938 A | * | 8/1984 | Allen .................. | B65D 17/163 220/270 |
| 4,742,585 A | * | 5/1988 | Logsdon ............... | E04G 15/061 220/3.3 |
| 4,759,463 A | * | 7/1988 | Mazoin .............. | B65D 43/0272 220/270 |
| 4,770,311 A | * | 9/1988 | Wang ..................... | H02G 3/123 220/3.2 |
| 4,990,345 A | * | 2/1991 | Webb .................. | B65D 77/245 206/205 |

(Continued)

*Primary Examiner* — King M Chu
(74) *Attorney, Agent, or Firm* — Oliff PLC

(57) ABSTRACT

A configurable enclosure including a cover portion operably attached to a base portion, the base portion including a wall disposed along a perimeter of a bottom surface, and a removable portion of the bottom surface configured to be peeled away from the base portion to create an opening on the bottom surface is provided. Moreover, an enclosure having a cover portion operably attached to a base portion, the base portion including a wall disposed around a perimeter of a bottom surface, a thin section of the bottom surface located proximate an outer edge of a removable portion of the bottom surface, an actuator operably attached to the removable portion, wherein through actuation of the actuator, the removable portion peels away from the bottom surface to create an opening on the base portion is also provided. Furthermore, an associated method is also provided.

33 Claims, 19 Drawing Sheets

(56) References Cited

U.S. PATENT DOCUMENTS

| | | | | |
|---|---|---|---|---|
| 5,114,068 | A * | 5/1992 | Reil | B65D 77/2056 220/270 |
| 5,125,527 | A | 6/1992 | Parlatore et al. | |
| D331,740 | S | 12/1992 | Kaplan | |
| 6,184,468 | B1 * | 2/2001 | Speziale | H02G 3/14 174/66 |
| 6,242,697 | B1 | 6/2001 | Gerken et al. | |
| 6,264,056 | B1 * | 7/2001 | King | E03C 1/20 206/518 |
| 6,265,670 | B1 | 7/2001 | Duesterhoeft et al. | |
| 6,274,809 | B1 * | 8/2001 | Pudims | H02G 3/185 174/486 |
| D452,487 | S | 12/2001 | Kaplan | |
| 6,545,216 | B1 * | 4/2003 | Bell | H02G 3/18 174/50 |
| 6,669,041 | B2 * | 12/2003 | Almond | H02G 3/383 220/3.6 |
| 6,765,147 | B1 | 7/2004 | Weiss et al. | |
| 6,914,187 | B2 | 7/2005 | Hull et al. | |
| 6,953,890 | B2 * | 10/2005 | Koessler | H02G 3/081 174/50 |
| 7,078,623 | B1 | 7/2006 | Sheehan | |
| 7,353,961 | B2 | 4/2008 | Hull et al. | |
| 7,359,611 | B1 | 4/2008 | Kaplan | |
| 7,432,439 | B2 | 10/2008 | Takada et al. | |
| 7,477,829 | B2 | 1/2009 | Kaplan | |
| 7,575,122 | B2 | 8/2009 | Hull et al. | |
| 7,918,430 | B2 * | 4/2011 | Romerein | H04M 1/0293 248/223.41 |
| 7,963,497 | B2 * | 6/2011 | Romerein | H04M 1/0293 248/223.41 |
| 8,254,567 | B2 | 8/2012 | Kaplan et al. | |
| 8,777,279 | B2 | 7/2014 | Kothy | |
| 2003/0136780 | A1 * | 7/2003 | Sato | H02G 3/10 220/3.8 |
| 2003/0178421 | A1 * | 9/2003 | Almond | H02G 3/383 220/3.8 |
| 2009/0314907 | A1 | 12/2009 | Romerein et al. | |
| 2011/0031365 | A1 | 2/2011 | Romerein et al. | |

* cited by examiner

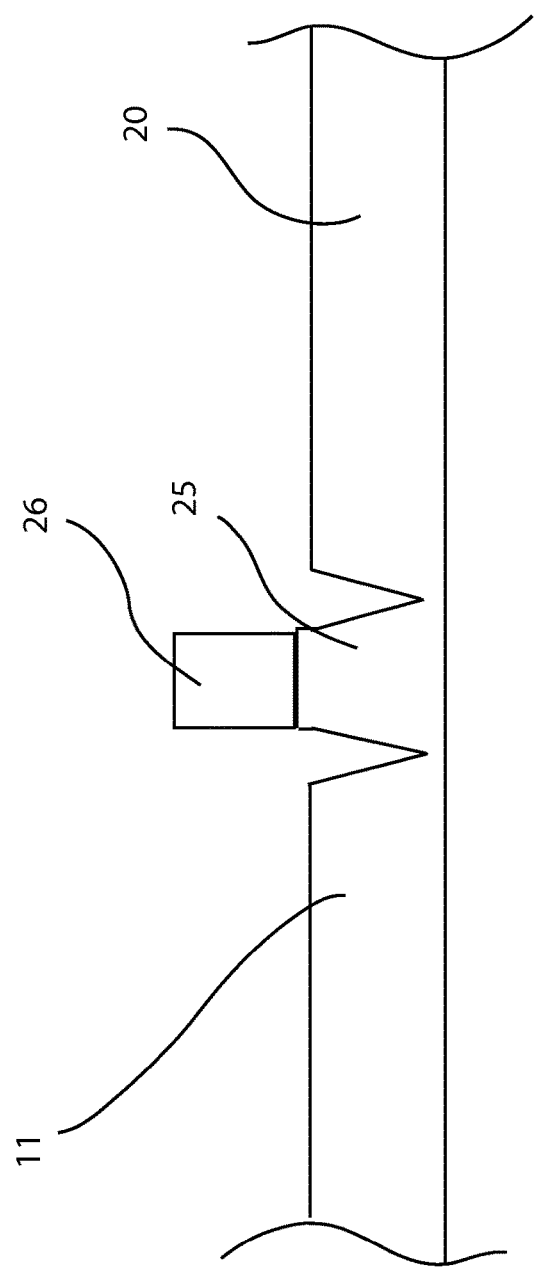

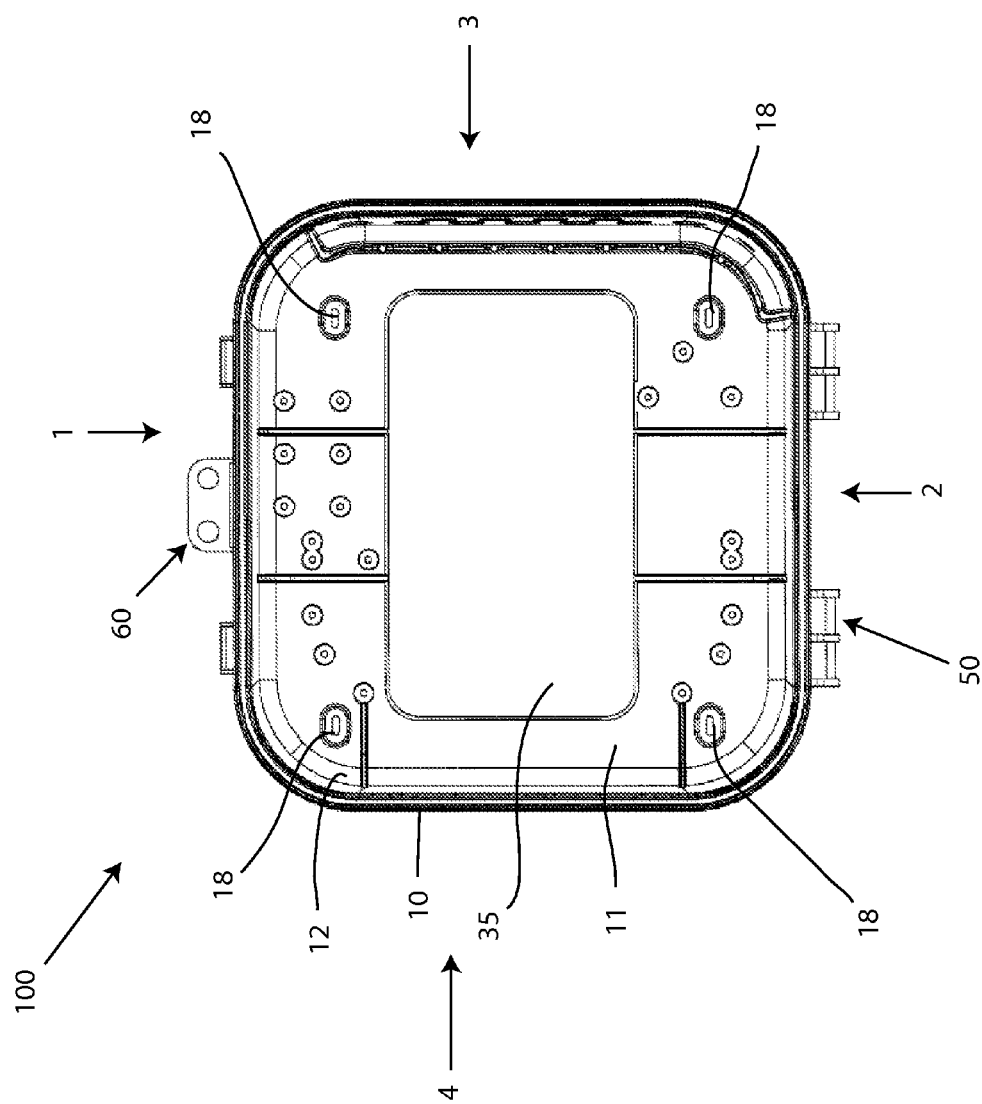

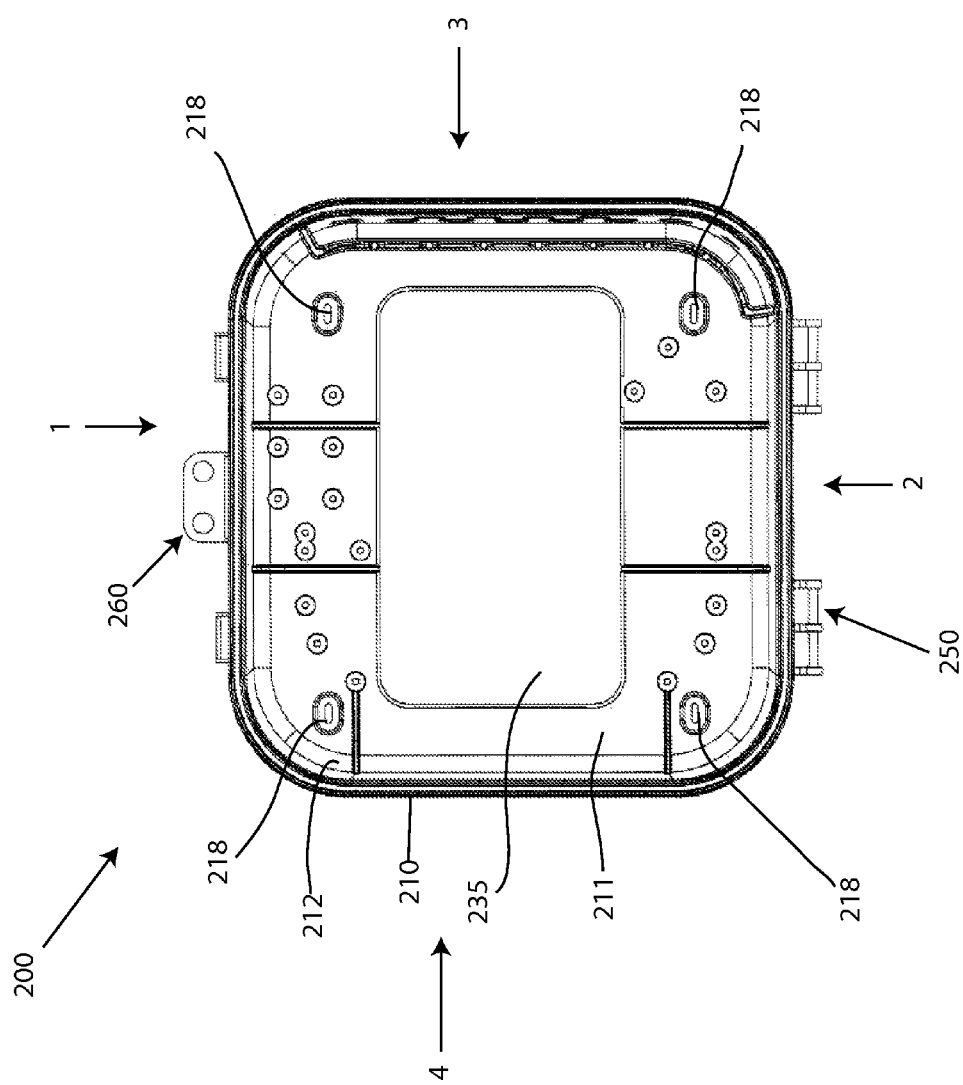

CONFIGURABLE ENCLOSURE

CROSS REFERENCE TO RELATED APPLICATIONS

This application claims the benefit and priority of, U.S. patent application Ser. No. 13/074,644, filed on Mar. 29, 2011. The entire contents of such application is hereby incorporated by reference.

BACKGROUND

The following relates to a configurable enclosure, and more specifically to embodiments of an enclosure that eliminates the need for tools during installation.

Installation of cable service requires some transmission lines and other electronic equipment to remain outdoors, housed within an enclosure, such as a cable box shield. The enclosure is typically externally mounted to a structure, such as a dwelling, an office building, or a pole. Housing the transmission lines and other electronic equipment within the externally mounted enclosure allows a technician to service a location, often times without the need to enter a consumer's home or office, by accessing the housed transmission lines and other equipment. However, existing hardware, connections, and various ports on the structure may present a problem when mounting the enclosure to the structure. Generally, tools, such as a hammer and knife, are required to punch out or cut away a portion of the enclosure to fit over the existing hardware, connections, and various ports. Using tools to carefully extract a portion of the enclosure adds installation time, and exposes the technician to injury and the enclosure to damage, even for the most skilled technician.

SUMMARY

Given the problems noted above, a need exists for an apparatus and method for removing a portion of an enclosure without the need for tools during installation.

A first general aspect relates to a configurable enclosure comprising a cover portion operably attached to a base portion, the base portion including a wall disposed along a perimeter of a bottom surface, and a removable portion of the bottom surface configured to be peeled away from the base portion to create an opening on the bottom surface.

A second general aspect relates to an apparatus comprising an enclosure having a cover portion operably attached to a base portion, the base portion including a wall disposed around a perimeter of a bottom surface, and a track disposed on the bottom surface of the base portion, the track substantially surrounding a removable portion of the bottom surface, wherein the track is attached to a thin portion of the bottom surface, wherein when the track is peeled away from the bottom surface, the removable portion is released from the base portion.

A third general aspect relates to an apparatus comprising an enclosure having a cover portion operably attached to a base portion, the base portion including a wall disposed around a perimeter of a bottom surface, a thin section of the bottom surface located proximate an outer edge of a removable portion of the bottom surface, and an actuator operably attached to the removable portion, wherein through actuation of the actuator, the removable portion peels away from the bottom surface to create an opening on the base portion.

A fourth general aspect relates to a configurable enclosure comprising a cover portion operably attached to a base portion, the base portion including a wall disposed along a perimeter of a bottom surface, and a means for peeling away a portion of the bottom surface of the base portion.

A fifth general aspect relates to a method of creating an opening in a configurable enclosure, comprising providing an enclosure having a cover portion operably attached to a base portion, the base portion including a wall disposed around a perimeter of a bottom surface, disposing a track on the bottom surface of the base portion, the track substantially surrounding a removable portion of the bottom surface, and reducing a thickness of the bottom surface proximate an outer edge of the removable portion, wherein the track is configured to be peeled from the bottom surface to release the removable portion and create an opening in the base portion.

A sixth general aspect relates to a method of creating an opening in a configurable enclosure, comprising providing an enclosure having a cover portion operably attached to a base portion, the base portion including a wall disposed around a perimeter of a bottom surface, disposing an actuator on a removable portion of the bottom surface of the base portion, and reducing a thickness of the bottom surface proximate an outer edge of the removable portion, wherein the actuator is configured to be pulled to peel away the removable portion and create an opening in the base portion.

The foregoing and other features of construction and operation will be more readily understood and fully appreciated from the following detailed disclosure, taken in conjunction with accompanying drawings.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 4A depicts a cross-section view of an embodiment of a bottom surface and a removable portion in accordance with the first embodiment of the enclosure.

FIG. 5 depicts a top view of the first embodiment of the enclosure after the removable portion has been removed.

FIG. 8 depicts a top view of the second embodiment of the enclosure after the removable portion has been removed.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
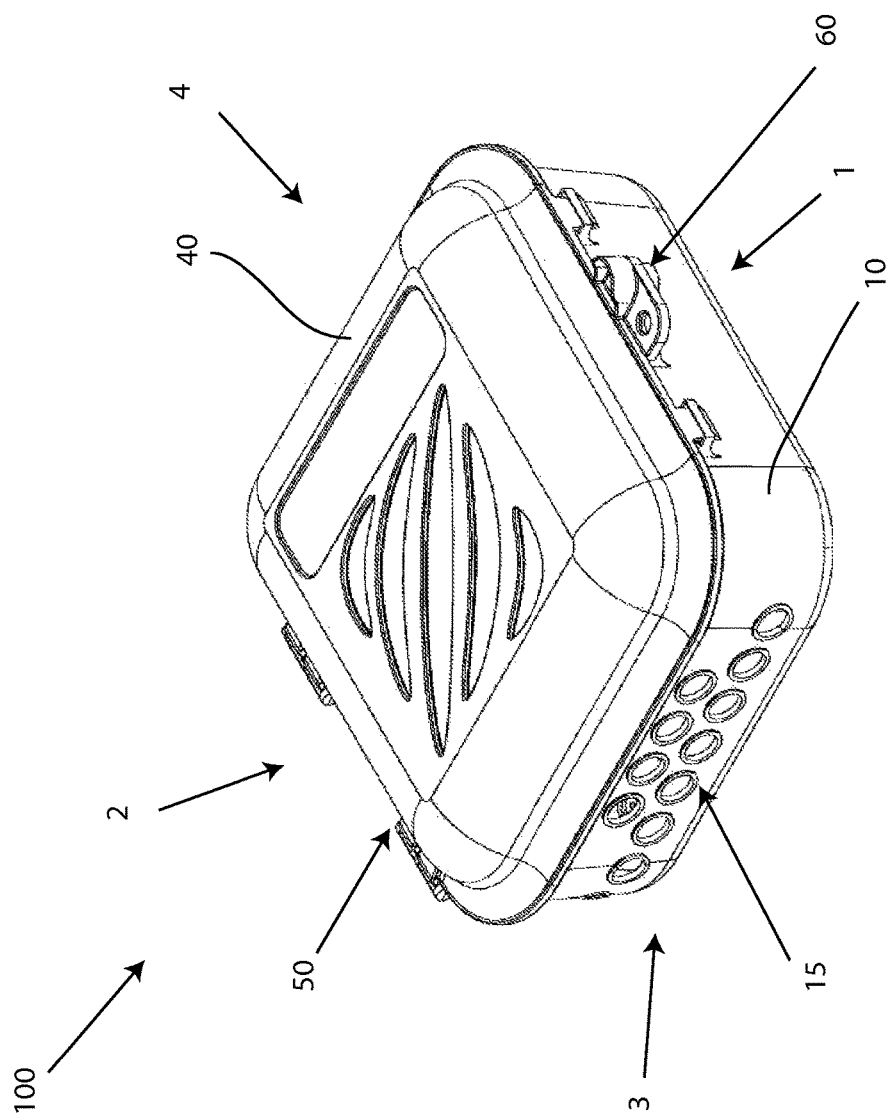
FIG. 1 depicts a perspective view of a first embodiment of an enclosure in a closed position.

Referring to the drawings, FIG. 1 depicts an embodiment of an enclosure 100. Enclosure 100 may be a configurable enclosure, a terminal box, a cable box shield, a cable box, a junction box, a service box, and the like. Enclosure 100 may be used to house, enclose, shield, cover, protect, etc., various devices associated with broadband communications, including transmission lines, such as coaxial cables, optical fibers, and the like, splitters, switches, electrical wiring, and other specialized electronic and/or communication equipment. Moreover, enclosure 100 may be externally mounted to a structure during installation of cable service or other broadband communication service.

Embodiments of enclosure 100 may include a base portion 10 and a cover portion 40. The base portion 10 may include a plurality of openings 15 and a removable portion 20. Embodiments of enclosure 100 may further include a connection means 50 to operably attach the cover portion 40 to the base portion 10, and a locking means 60 to secure the enclosure 100 in a closed position. Other embodiments of enclosure 100 may include a cover portion 40 operably attached to a base portion 10, the base portion 10 including a wall 12 disposed along a perimeter of a bottom surface 11, and a removable portion 20 of the bottom surface 11 configured to be peeled away from the base portion 10 to create an opening 35 on the bottom surface 11. Embodiments of enclosure 100 may also include a cover portion 40 operably attached to a base portion 10, the base portion 10 including a wall 12 disposed along a perimeter of a bottom surface 11, and a means for peeling away a portion of the bottom surface 11 of the base portion 10.

Figure 2:
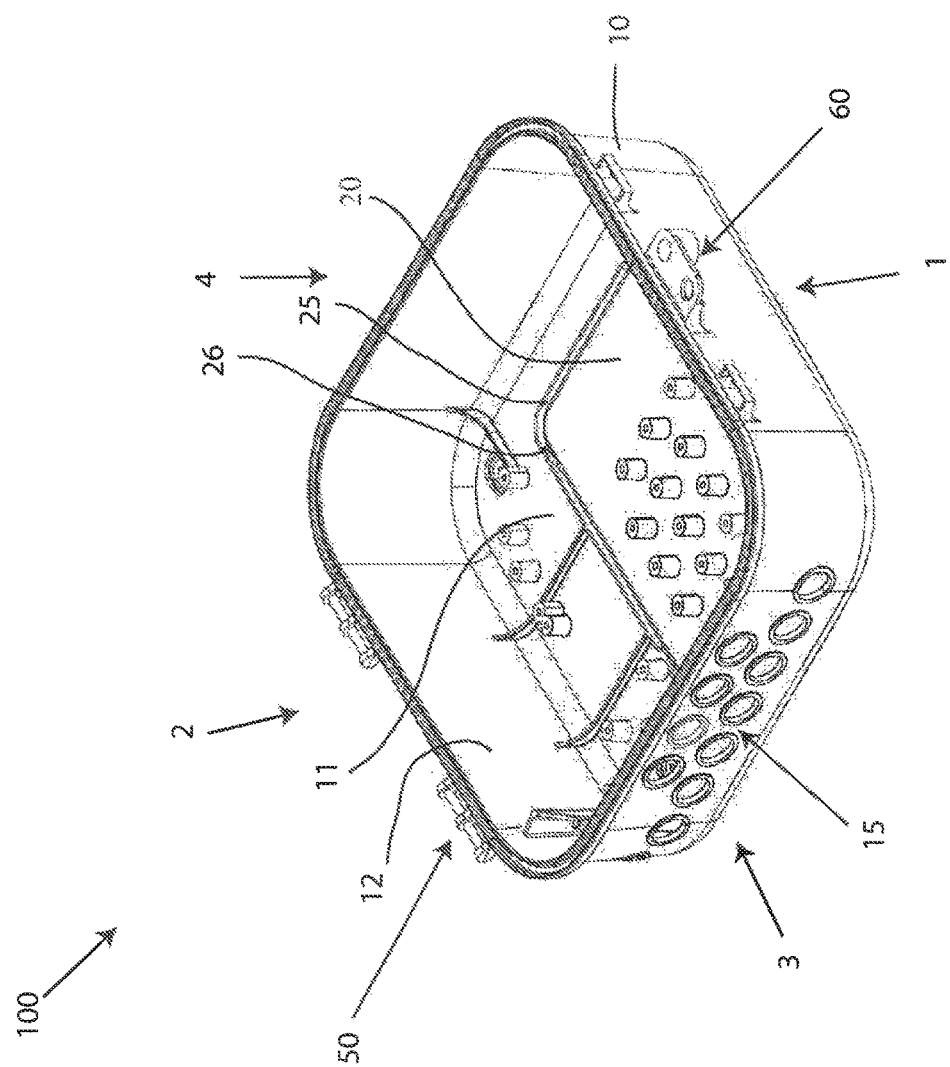
FIG. 2 depicts a perspective view of the first embodiment of the enclosure.

Referring now to FIG. 2, embodiments of enclosure 100 may include a base portion 10. The base portion 10 may include a bottom surface 11 and a wall 12. The wall 12 may be a wall, side, edge, side wall, barrier, and the like, having a certain height extending upwards from the bottom surface 11. The wall 12 may extend along a perimeter of the bottom surface 11, wherein the wall 12 is structurally integral with the bottom surface 11 (e.g. the bottom surface 11 and the wall 12 may be molded as a single structural component). The bottom surface 11 may be many different shapes, such as a rectangle, square, circle, etc. which may determine the overall shape and configuration of the enclosure 100. Thus, the enclosure 100 may be a square enclosure, a rectangular enclosure, a circular enclosure, or any polygonal enclosure. Rectangular, square, and quadrilateral embodiments of enclosure 100 may include a first end 1, a second end 2, a first side 3, and a second side 4. Moreover, the height of the wall 12 can determine a depth of the enclosure 100, with respect to the base portion 10. Likewise, the height of the wall 12 in conjunction with the surface area of the bottom surface 11 may determine the volume of the base portion 10. The base portion 10 may be comprised of molded plastic, composites, metal, or a combination of materials. For example, the base portion 10 may include metallic components attached to or integrated with the overall molded plastic structure.

Positioned somewhere on the bottom surface 11 may be at least one mounting hole 18. The mounting hole 18, or the plurality of the mounting holes 18 may be a means to secure, mount, affix, etc., the enclosure 100 to a structure. Embodiments of enclosure 100 may include a mounting hole 18 proximate or otherwise near each corner of the base portion 10. The mounting holes 18 may accept various fasteners, such as screws, to fasten the enclosure 100 to a structure or other rigid body, such as a pole. Additionally, a plurality of pegs may be placed within the base portion 10 to assist the arrangement and operable placement of transmission lines and/or other equipment inside the enclosure 100. The pegs may upwardly protrude from the bottom surface 11 a distance, generally shorter than the height of wall 12 of the base portion 10; however, the pegs may protrude further than the height of the wall 12 if the cover portion 40 is dimensioned to add volume to the enclosure 100 when in a closed position.

Figure 14:
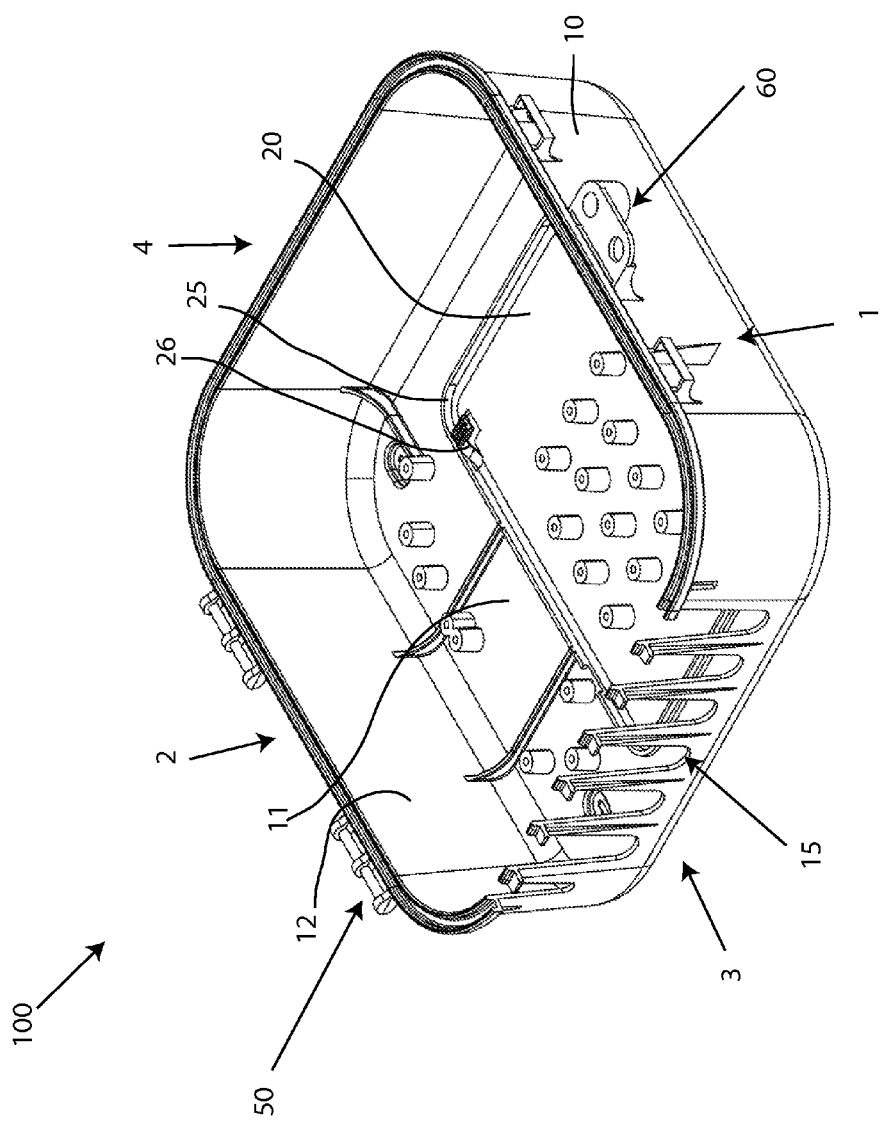
FIG. 14 depicts a perspective view of the first embodiment of the enclosure having a plurality of slots on a side wall.
Figure 15:
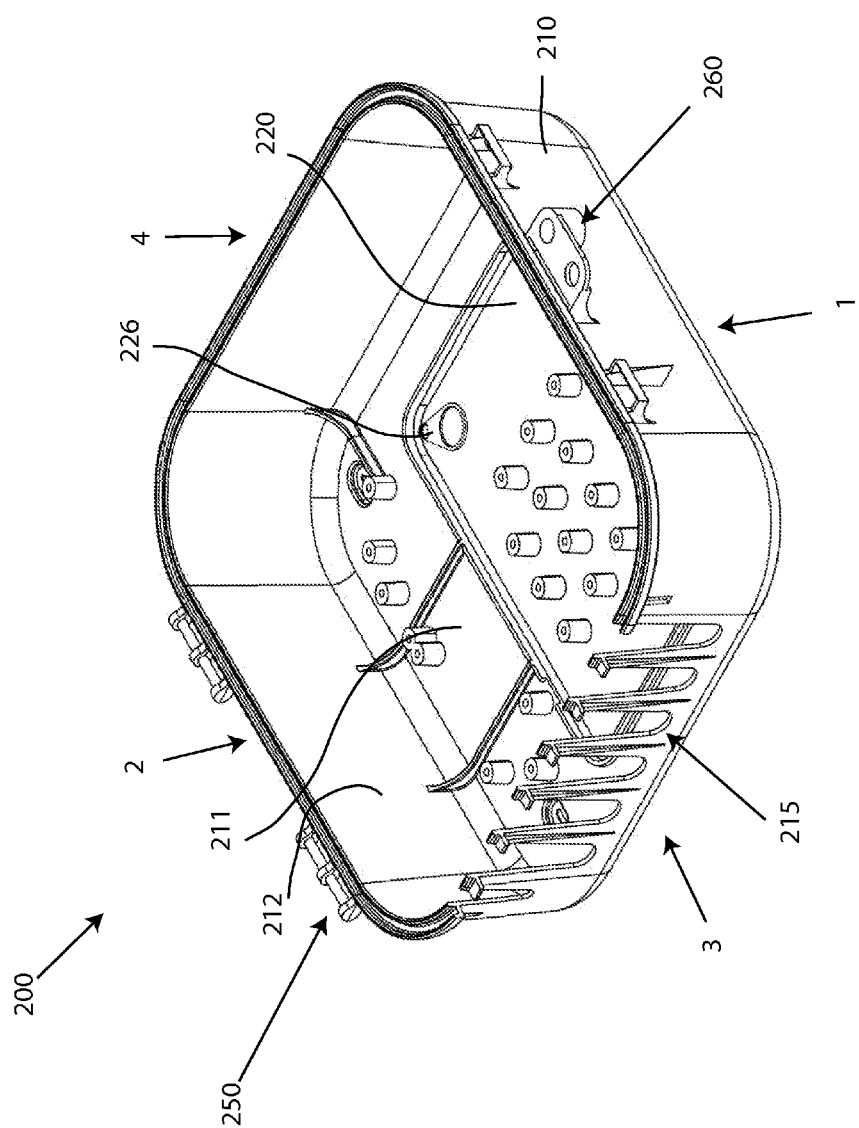
FIG. 15 depicts a perspective view of the second embodiment of the enclosure having a plurality of slots on a side wall.
Figure 16:
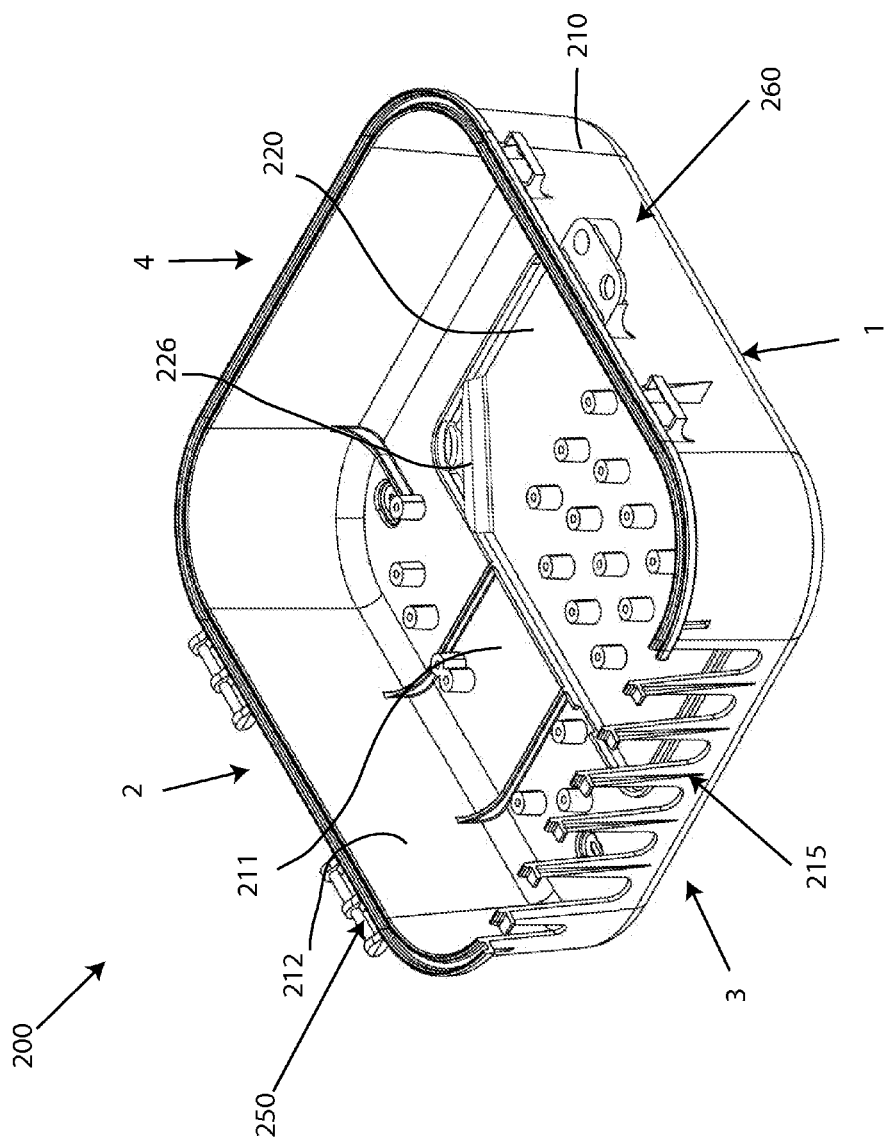
FIG. 16 depicts a perspective view of the second embodiment of the enclosure having a plurality of slots on a side wall, wherein an embodiment of the removable portion is partially removed.
Figure 17:
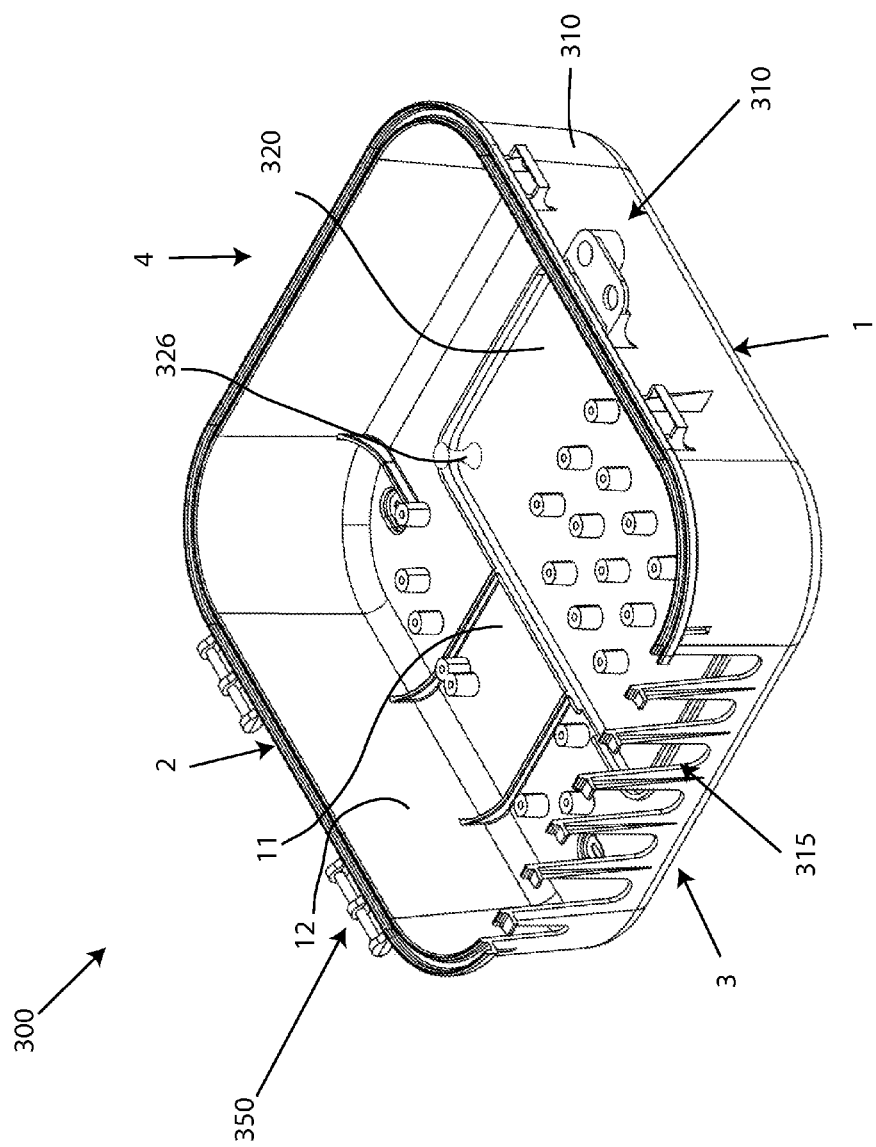
FIG. 17 depicts a perspective view of the third embodiment of the enclosure having a plurality of slots on a side wall.

Furthermore, a plurality of openings 15 may be positioned on the wall 12 to provide clearance for transmission lines, line wiring, load wiring, electrical wires, and other telecommunication paths to enter the enclosure 100 and interact with the equipment and lines located within the enclosure 100. The plurality of openings 15, or a single opening, may be an opening, hole, access point, access hole, slot, slit, and the like, which may allow a coaxial cable, or similar line, to pass through the wall 12 of the base portion 10. Embodiments of the plurality of openings 15 of enclosure 100 being a plurality of slots in the wall 12 that include an open end at the top of the wall 12 such that cables, lines, etc. may be dropped into the accommodating slot, (e.g. U-shaped or valley shaped) is shown in FIG. 14. FIGS. 15-17 shows similar embodiments of slots 215, 315 in the wall 12, 212, 312 of enclosure 200, 300, respectively. Embodiments of enclosure 100 may include a plurality of openings 15 on the wall 12 proximate the first side 3. Further embodiments include a plurality of openings 15 on both the first side 3 and the second side 4. However, those skilled in the art should appreciate that a plurality of openings 15, or a single opening, may also be present on the first end 1 and the second end 2, or could be present on each side or any combination of sides of the enclosure 100 to allow for multiple configurations of enclosure 100. Generally, the openings 15 are circular or U-shaped and sized to accommodate common broadband equipment, such as coaxial cable; however, the shape of the openings 15 may be any shape or size to accommodate various shaped/sized equipment, such as slots shown in FIG. 14. The enclosure 100 may be provided with pre-existing openings 15, or the enclosure 100 may be provided with a means to punch out the openings 15 as desired. For example, the base portion 10 may include a plurality of openings 15 that function as knockouts along the wall 12 to allow a technician/installer to create access holes at the time of installation, as opposed to the base portion 10 being manufactured with pre-existing openings 15. Embodiments of the enclosure 100 may include knockouts at other locations/orientations in addition to pre-existing openings 15 along the wall 12 of the base portion 10. The knockouts may be formed by conventional methods known to those skilled in the art, such as scoring the wall 12 of the base portion 10, at the time of manufacture.

Figure 3:
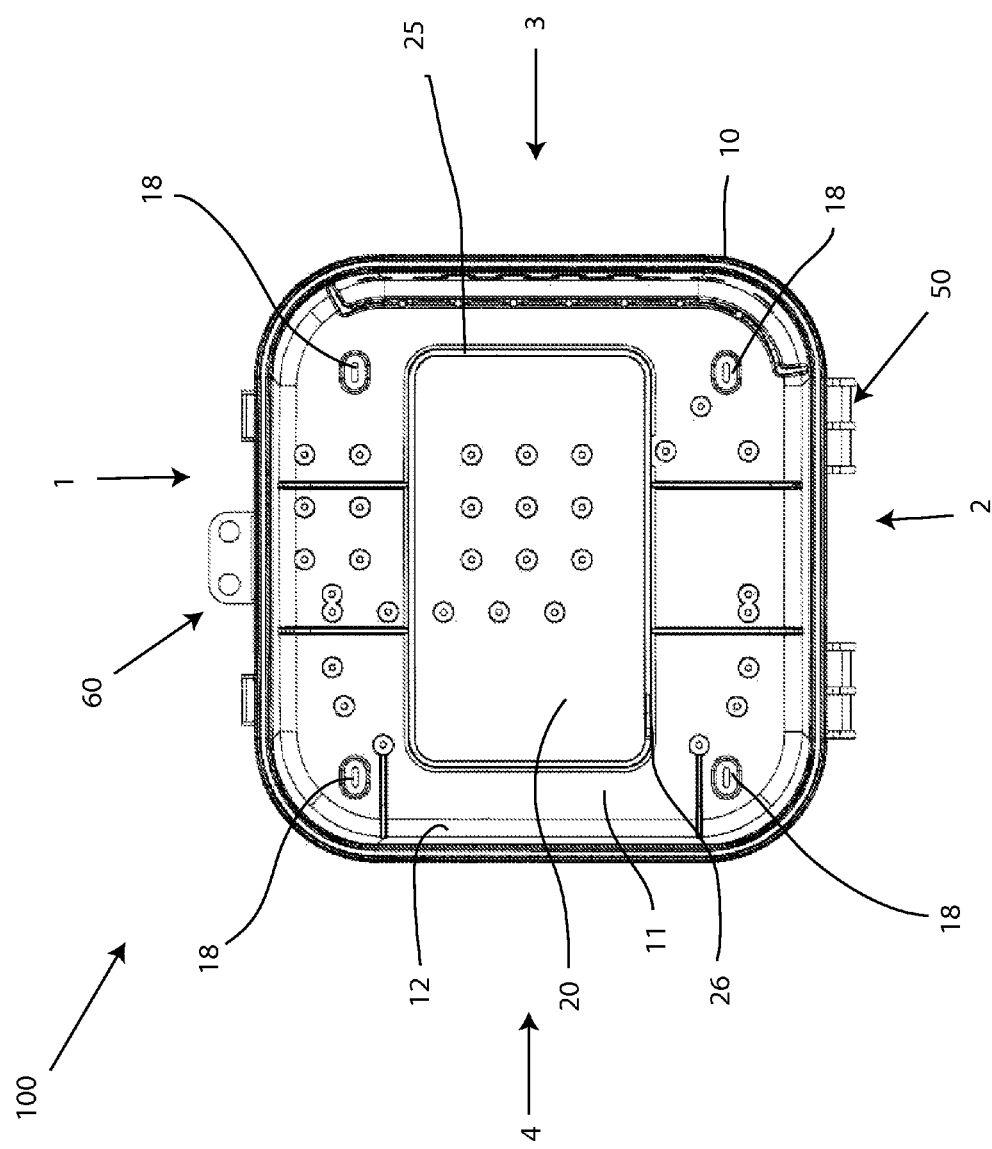
FIG. 3 depicts a top view of the first embodiment of the enclosure.

With continued reference to FIG. 2, and additional reference to FIG. 3, embodiments of enclosure 100 may include one or more removable portions 20. The removable portion 20 of the base portion 10 may be removed without the use of tools or other items associated with punching out and/or cutting away a portion of an enclosure, such as enclosure 100. For example, the removable portion 20 may be removed, peeled away, discarded, eliminated, extracted, etc. from the bottom surface 11 of the base portion 10 to expose the internals of the enclosure 100. In other words, a portion of the bottom surface 11 of the base portion 10 may be removed, or peeled away, to create an opening 35 in the bottom surface 11 (e.g. by the removal and displacement of the removable portion 20 of the base portion 10). The opening 35 (as shown in FIG. 5) created when a portion of the bottom surface 11 is removed may provide the necessary clearance for any existing hardware, connections, and various ports which may be located on a structure when mounting the enclosure 100 to the structure. For instance, a technician may need to install an enclosure 100 at a location on the outer wall of the structure where existing hardware is fixedly mounted. Instead of wielding a knife and hammer to carve out a portion of the bottom surface of an enclosure to clear the existing hardware, the technician may remove, peel away, tear away, etc., without tools, on or more removable portions 20 from the enclosure 100 without risking injury to themselves or damage to the enclosure 100.

Referring now to FIGS. 2-3, removing the removable portion 20 from the enclosure 100 may involve peeling away a track 25 positioned on the bottom surface 11 of the base portion 10 to release a portion of the bottom surface 11 from the base portion 10. The portion of the bottom surface 11 being released from the base portion 10 after the track 25 has been peeled away may be referred to as the removable portion 20. The removable portion 20 may be a single-piece removable portion 20, or may be segmented into multiple sections of the removable portion 20 (i.e. multiple sections of the removable portion 20 each having a track and actuator to facilitate the removal of a section of the removable portion 20). The size of the removable portion 20 may vary, and may be determined at the time of manufacturing; the size of the track 25 should correspond to the size of the desired removable portion 20. The track 25 may be located proximate or otherwise near the perimeter of the removable portion 20, and extend around or substantially around the perimeter of the removable portion 20. In other words, the track 25 may be disposed on the bottom surface 11 of the base portion 10, around the removable portion 20, which may help identify the removable portion 20. Once the track 25 is completely peeled away, the removable portion 20 may cleanly fall away from the enclosure 100. Attached to the track 25 may be an actuator 26, such as a pull tab, which may facilitate the removal of the track 25. For instance, a user may grip the actuator 26, which may protrude from the track 25, and pull the actuator 26 in a direction away from the bottom surface 11 to peel away the track 25 from the base portion 10. Accordingly, embodiments of enclosure 100 may include a cover portion 40 operably attached to a base portion 10, the base portion 10 including a wall 12 disposed around a perimeter of a bottom surface 10, and a track 25 disposed on the bottom surface 11 of the base portion 10, the track 25 substantially surrounding a removable portion 20 of the bottom surface 10, wherein the track 25 is attached to a thin portion of the bottom surface 11, wherein when the track 25 is peeled away from the bottom surface 11, the removable portion 20 is released from the base portion 10.

Figure 4B:
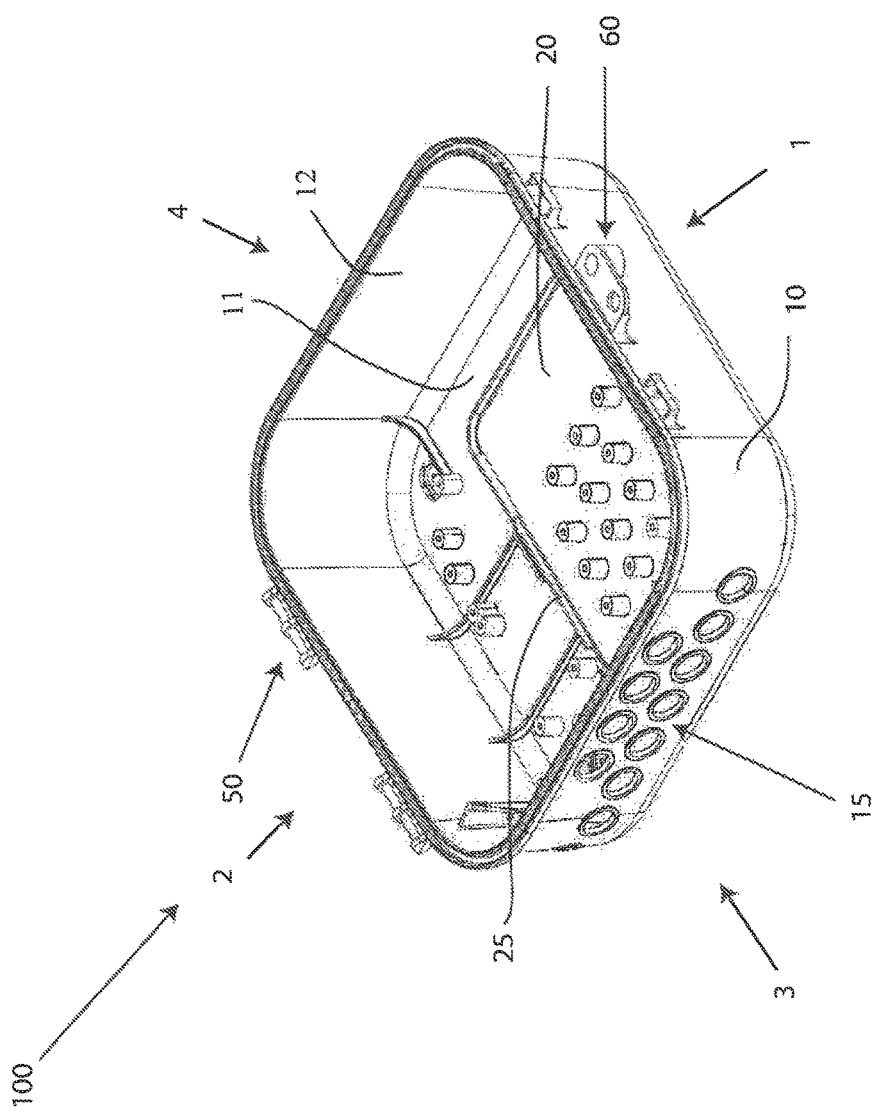
FIG. 4B depicts a perspective view of the first embodiment of the enclosure with an embodiment of a track partially peeled from the bottom surface.

With reference to FIGS. 4A and 4B, the removal or peeling away of the track 25 causes the removable portion 20 to peel away or fall from the base portion 10 because the force/stress exerted by the movement of the track 25 severs a thin structural or mechanical bond between the track 25 and the bottom surface 11 and the removable portion 20, respectively. Thus, the removable portion 20 no longer mechanically or structurally connects to the base portion 10, and falls away from the base portion 10 to create opening 35. For example, the thickness of the bottom surface 11 proximate or adjacent to the track 25 may be thin (e.g. may taper to a smaller thickness proximate the track 25). Because the cross-section of the bottom surface 11 proximate or adjacent to the track 25 is thin, the shearing force of the track 25 as it is pulled away from the bottom surface 11 and removable portion 20 along the perimeter of the removable portion 20 is large enough to mechanically disengage (e.g. break apart) the track 25 from the bottom surface 11. The cross-section of the bottom surface 11 proximate the track 25 may be any geometrical configuration. Likewise, the thickness of the removable portion 20 proximate or otherwise near the perimeter of the removable portion 20 (i.e. adjacent to the track 25) may be thin (e.g. may taper to a smaller thickness proximate an outer edge of the removable portion 20). Because the cross-section of the removable portion 20 proximate or otherwise near the track 25 is thin, the shearing force of the track 25 as it is pulled away from the bottom surface 11 and the removable portion 20 along the perimeter of the removable portion 20 is large enough to mechanically disengage (e.g. break apart) the track 25 from the removable portion 20. The cross-section of the removable portion 20 proximate the track 25 may be any geometrical configuration. Therefore, when the track 25 is in motion, for example by gripping and pulling either the track 25 or the actuator 26, the thin surfaces of the bottom surface 11 and the removable portion 20 are fractured, sheared, snapped, broken apart, etc., releasing the removable portion 20 from the track 25 which results in the releasing of the removable portion 20 from the rest of the bottom surface 11. Opening 35 is now created in the base portion 10 to facilitate mounting the enclosure 100 at a particular location requiring access through the bottom of the enclosure 100.

Figure 6:
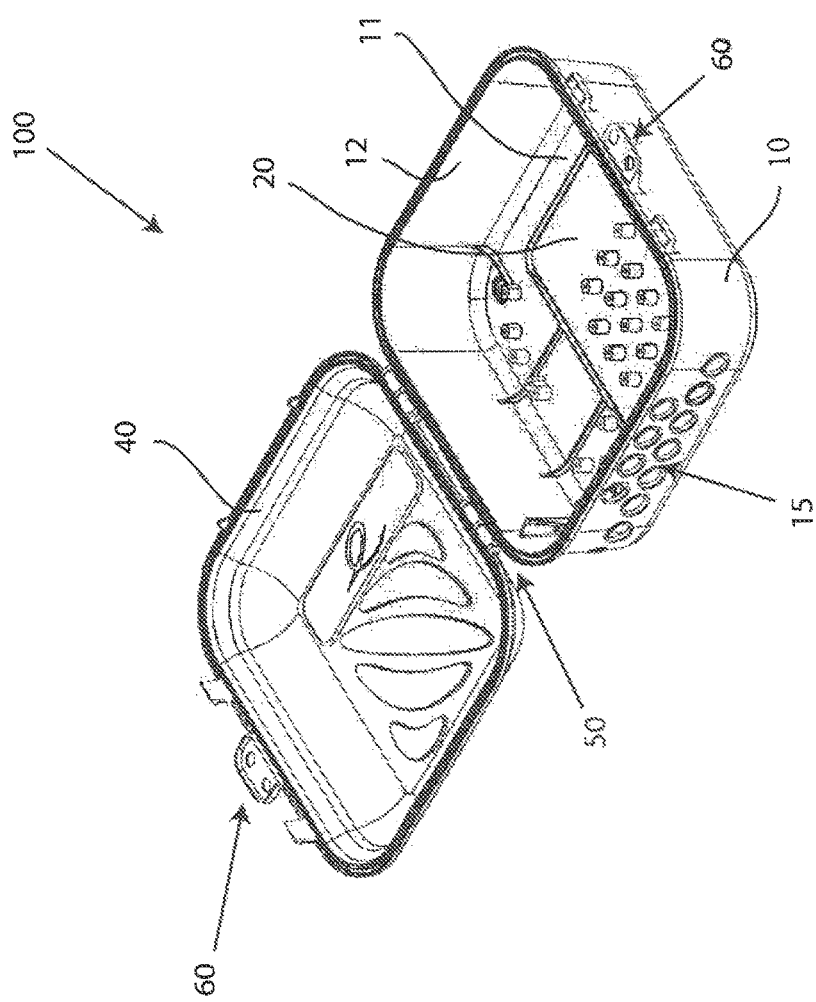
FIG. 6 depicts a perspective view of the first embodiment in an open position.

With reference now to FIG. 6, and additional reference to FIG. 1, embodiments of enclosure 100 may include a cover portion 40. The cover portion 40 may be operably connected to the base portion 10. The cover portion 40 may be hingedly connected to the base portion 10 through connection means 50. However, the cover portion 40 may be connected to the base portion 10 other than through a hinged connection, such as connection means 50. For instance, the cover portion 40 may be configured to snap on the base portion 10. Those skilled in the art should appreciate that the cover portion 40 may be operably connected to the base portion 10 through various fasteners, devices, methods, etc. Moreover, the cover portion 40 should be sized and dimensioned to completely or substantially cover the base portion 10 when in the closed position (shown in FIG. 1). For example, the perimeter of the cover portion 40 should be approximately the same size or slightly larger than the base portion 10 to form an enclosure 100 when the cover portion 40 is in the closed position (i.e. placed over the base portion 10). Moreover, the cover portion 40 may be flat or have a curvilinear surface to increase the volume of the enclosure 100 when in the closed position. Various configurations of the cover portion 40 may be implemented to form an enclosure 100 through a union with the base portion 10. The cover portion 40 may be comprised of the same materials as the base portion 10, or may comprised of a different material depending on the required strength of the enclosure 100. For instance, the cover portion 40 may comprise molded plastic, composites, metal, or a combination of known materials. For example, the cover portion 40 may include metallic components attached to or integrated with the overall molded plastic structure.

Embodiments of enclosure 100 may also include a locking means 60 to secure the cover portion 40 to the base portion 10. For instance, locking means 60 may securably join the cover portion 40 and the base portion 10 together to prevent unauthorized access to the transmission lines and other electronic/broadband equipment housed within enclosure 100. The locking means 60 may include known fasteners such as clips, hooks, clamps, snaps, and the like. Furthermore, locking means 60 may be configured to cooperate with standard locking devices, such as a loop to accommodate a combination lock, and professional locking devices/tools, such as a cable termination tool. Those having ordinary skill in the art should appreciate that various locking means may be used to secure the enclosure 100 in the closed position.

Figure 7A:
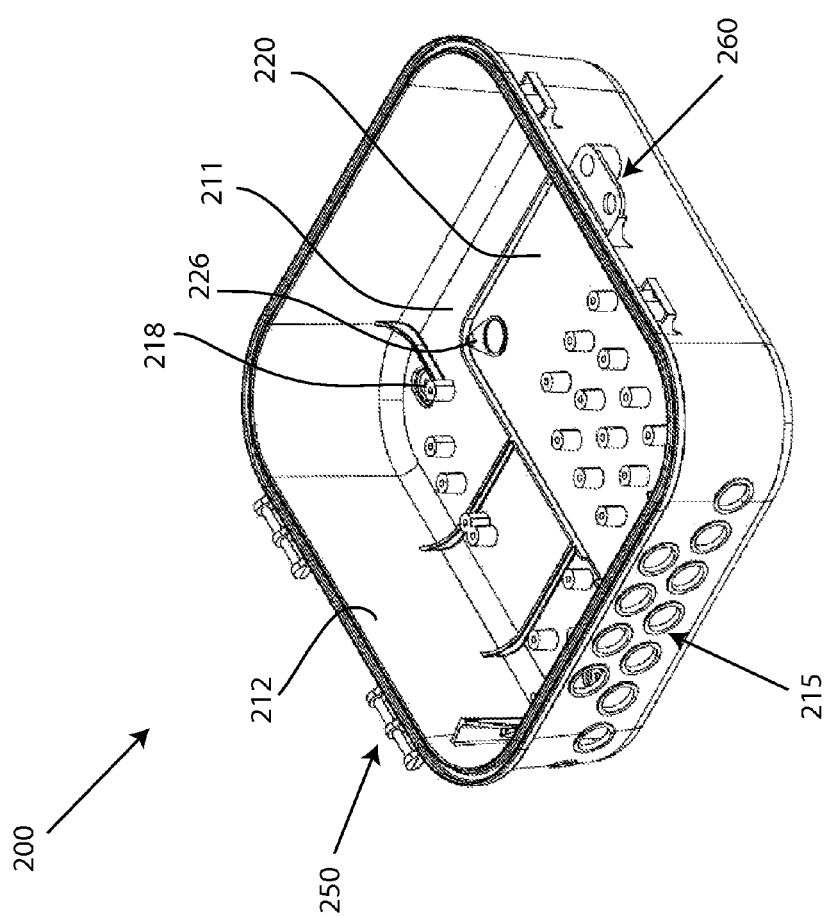
FIG. 7A depicts a perspective view of a second embodiment of the enclosure.
Figure 7B:
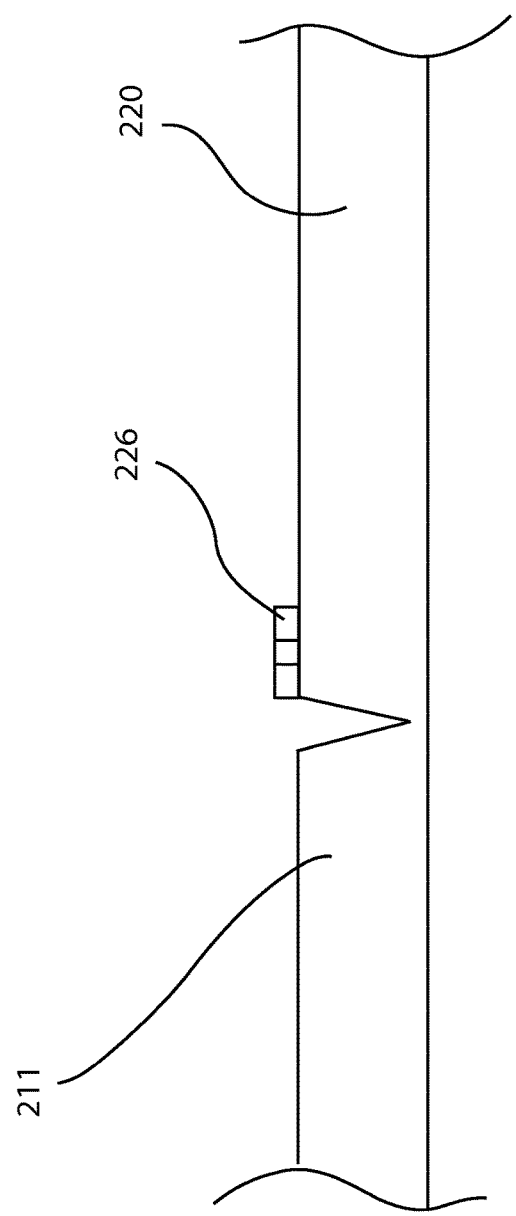
FIG. 7B depicts a cross-section view of the bottom surface of the second embodiment of the enclosure.

With continued reference to the drawings, FIGS. 7A and 7B depicts an embodiment of enclosure 200. The enclosure embodiment 200 may include a base portion 210 and a cover portion 240 (not shown). The base portion 210 may include a bottom surface 211, a wall 212, a plurality of openings 215, and a removable portion 220. Embodiments of enclosure 200 may further include a connection means 250 to operably attach the cover portion 240 to the base portion 210, and a locking means 260 to secure the enclosure 200 in a closed position. Enclosure 200 may have several similar features with enclosure embodiment 100. For example base portion 210, plurality of openings 215, cover portion 240, mounting holes 218, connection means 250, and locking means 260 may share the same structural and functional aspects as those components associated with enclosure 100. However, the embodiment of the enclosure 200 may include a removable portion 220. Embodiments of a removable portion 220 may have some similarities to the removable portion 20, but may include additional or different structural and/or functional aspects. The removable portion 220 of the base portion 210 may be removed, peeled away, discarded, eliminated, extracted, etc. from the bottom surface 211 of the base portion 210 to create an opening 235 in the bottom surface 211. The opening 235 (as shown in FIG. 8) created when a portion of the bottom surface 211 is removed may provide the necessary clearance for any existing hardware, connections, and various ports which may be located on a structure when mounting the enclosure 200 to the structure.

Figure 9:
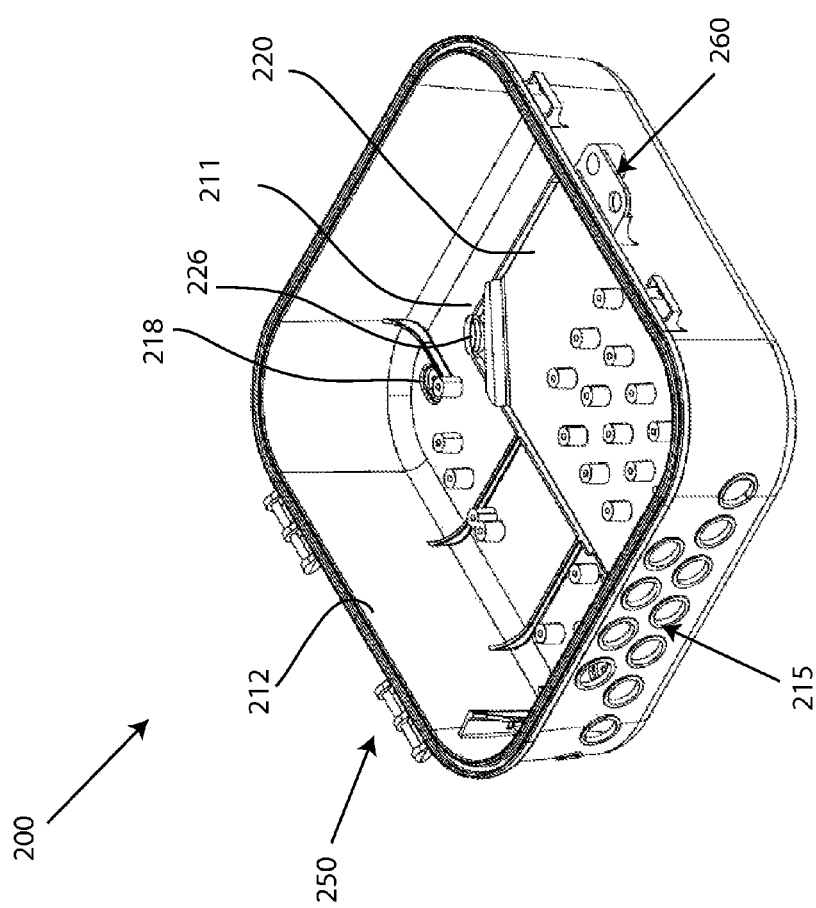
FIG. 9 depicts a perspective view of the second embodiment of the enclosure while the removable portion is partially removed.

Embodiments of a removable portion 220 may include an actuator 226, such as a pull tab or comparable device, operably attached to the removable portion 220. The actuator 226 may be mechanically attached/connected to the removable portion 220 proximate or otherwise near a corner of the removable portion 220. Through actuation of the actuator 226, the removable portion 220 may peel away or fall from the base portion 210 because the force/stress exerted by the displacement of the removable portion 220 severs a thin structural or mechanical bond between the bottom surface 211 and the removable portion 220. Thus, the removable portion 220 no longer mechanically or structurally connects to the base portion 210, and falls away from the base portion 210 to create opening 235. For example, the thickness of the bottom surface 211 surrounding or substantially surrounding the removable portion 220 may be thin (e.g. may taper to a smaller thickness proximate the perimeter of the removable portion 220). Likewise, the thickness of the removable portion 220 proximate or otherwise near the perimeter, or an outer edge, of the removable portion 220 may also be thin (e.g. may taper to a smaller thickness proximate the outer edge of the removable portion 220). Because the cross-section of the base portion 210 between the removable portion 220 and the bottom surface 211 is thin, the shearing force generated by the displacement of the removable portion 220 as it is pulled away from the bottom surface 211 is large enough to mechanically disengage (e.g. break apart) the removable portion 220 from the bottom surface 211. The cross-section of the base portion 210 between the removable portion 220 and the bottom surface 211 may be any geometrical configuration. Therefore, when the actuator 226 is pulled, the thin surface, or thin cross-section, between the bottom surface 211 and the removable portion 220 is fractured, sheared, snapped, severed broken apart, etc., releasing the removable portion 220 from the rest of the bottom surface 211. Opening 235 is now created in the base portion 210 to facilitate mounting the enclosure 200 at a particular location requiring access through the bottom of the enclosure 200. Those having skill in the art should appreciate that actuation of the actuator 226 may include an initial actuation of the actuator 226 toward a corner of the removable portion 220 to cause an initial break from the bottom surface 211; the actuator 226 may then be pulled in the reverse direction to peel the removable portion 220 away from the bottom surface 211, as shown in FIG. 9.

Figure 10:
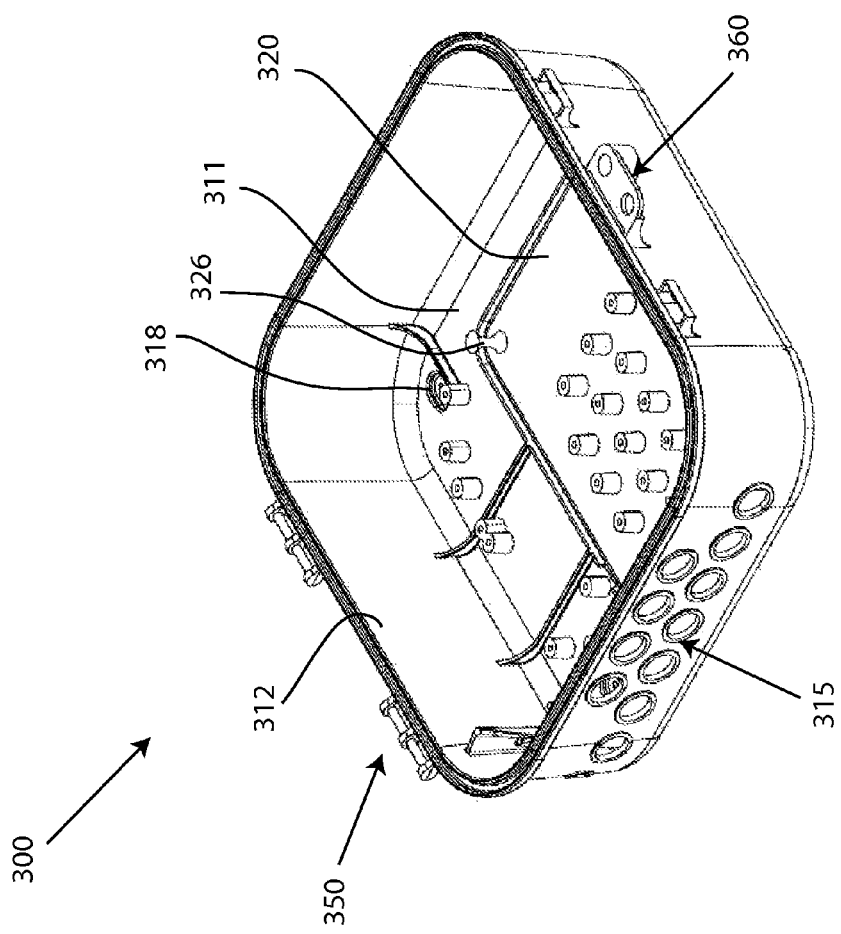
FIG. 10 depicts a perspective view of a third embodiment of the enclosure.
Figure 11:
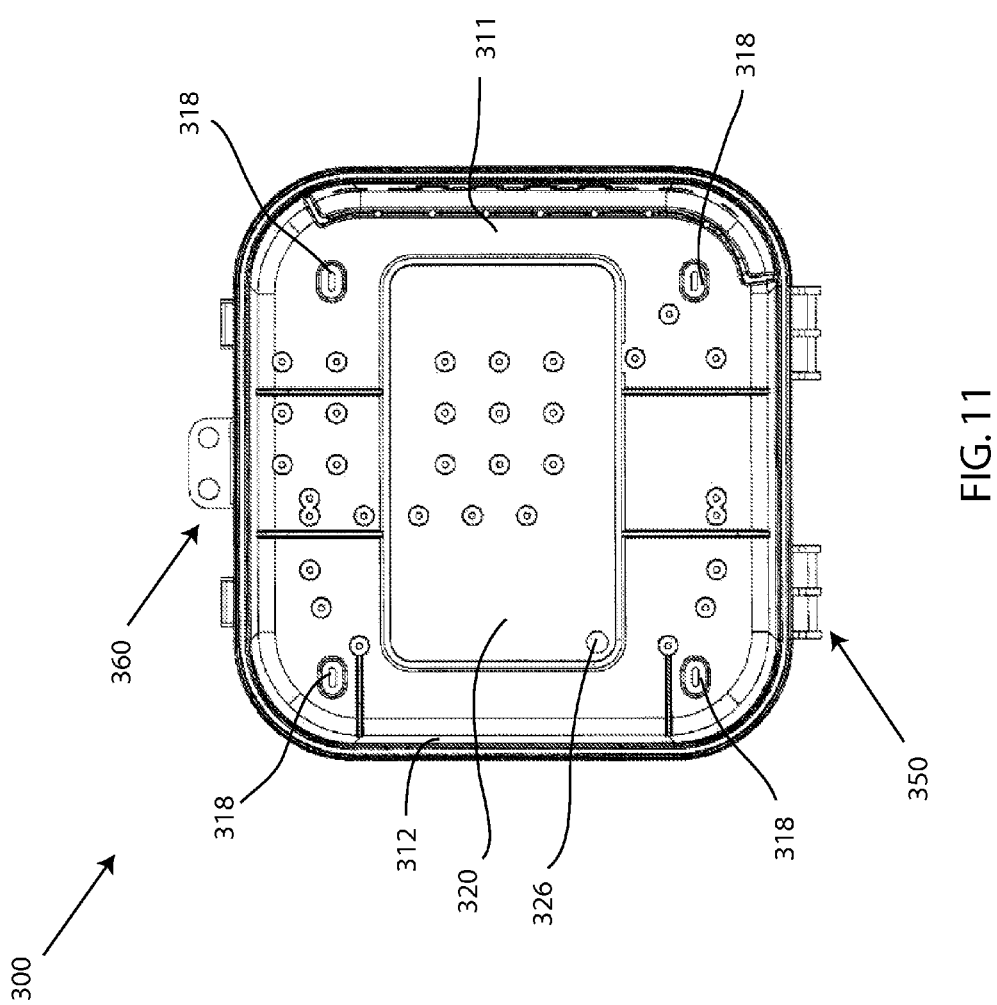
FIG. 11 depicts a top view of the third embodiment of the enclosure.
Figure 12:
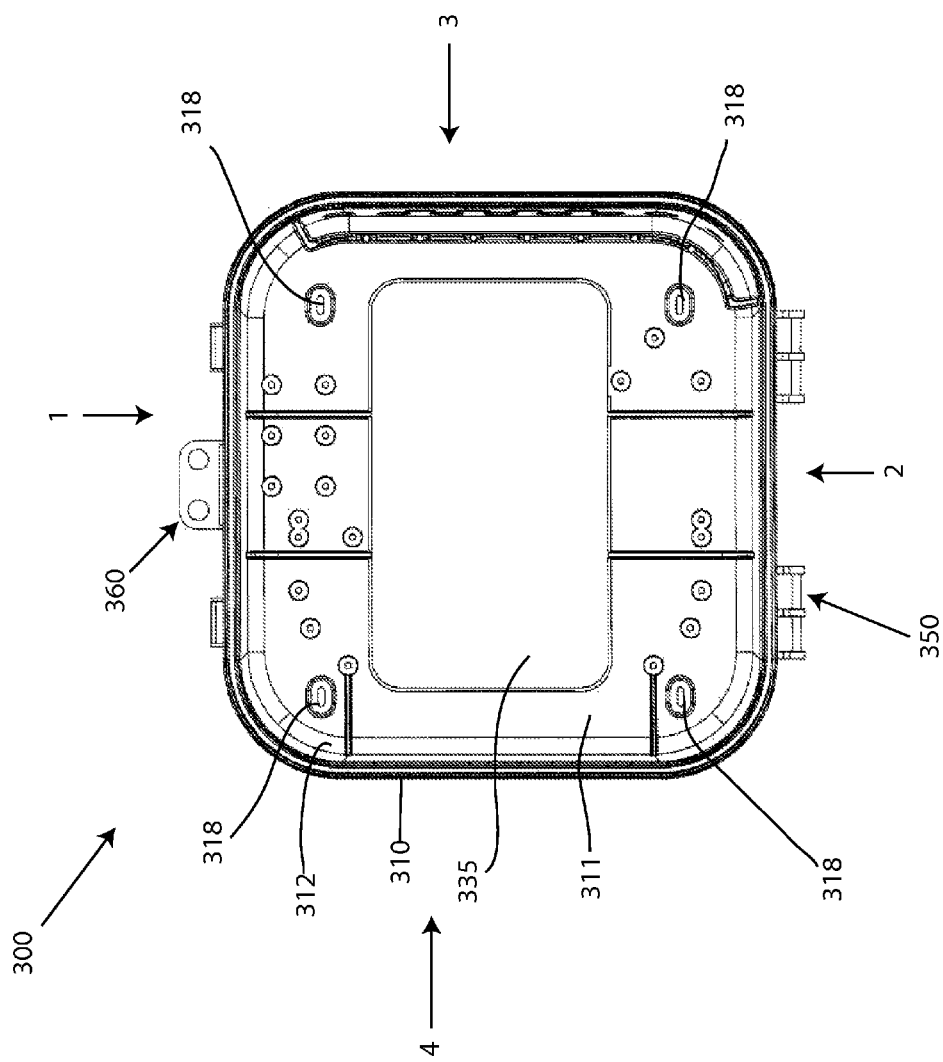
FIG. 12 depicts a top view of the third embodiment of the enclosure after the removable portion has been removed.

Referring now to FIGS. 10 and 11, an embodiment of enclosure 300 is depicted. The enclosure embodiment 300 may include a base portion 310 and a cover portion 340 (not shown). The base portion 310 may include bottom surface 311, a wall 312, a plurality of openings 315 and a removable portion 320. Embodiments of enclosure 300 may further include a connection means 350 to operably attach the cover portion 340 to the base portion 310, and a locking means 360 to secure the enclosure 300 in a closed position. Enclosure 300 may have several similar features with enclosure embodiment 100. For example base portion 310, plurality of openings 315, cover portion 340, mounting holes 318, connection means 350, and locking means 360 may share the same structural and functional aspects as those components associated with enclosure 100. However, the embodiment of the enclosure 300 may include a removable portion 320. Embodiments of a removable portion 320 may be peeled away from a bottom surface 311 of the base portion 310 in a similar manner as the removable portion 220, but may include actuator 326. For example, a thin section between the removable portion 320 and the bottom surface 311 may be severed by the displacement of the removable portion 320. Thus, removable portion 320 of the base portion 310 may be removed, peeled away, discarded, eliminated, extracted, etc. from the bottom surface 311 of the base portion 310 to create an opening 335 in the bottom surface 311. The opening 335 (as shown in FIG. 12) created when a portion of the bottom surface 311 is removed may provide the necessary clearance for any existing hardware, connections, and various ports which may be located on a structure when mounting the enclosure 300 to the structure.

Figure 13:
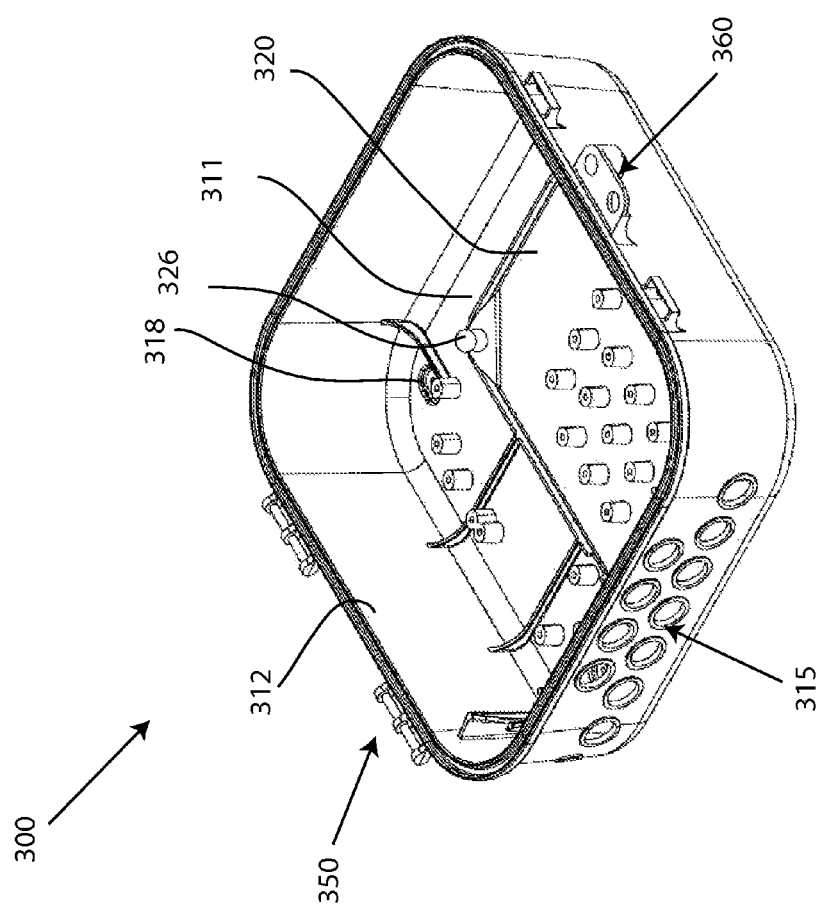
FIG. 13 depicts a perspective view of the third embodiment of the enclosure while the removable portion is partially removed.

Embodiments of enclosure 300 may include a removable portion 320 having an actuator 326. Actuator 326 may be mechanically attached to the removable portion 320 through fasteners, bonding agents, etc., or may be structurally integral with the removable portion 320. The actuator 326 may be disposed proximate or otherwise near a corner of the removable portion 320. Moreover, actuator 326 may protrude a distance from the removable portion 320, and may be stationary (e.g. does not hinge forward or backward). In other words, actuator 326 does not require an initial actuation toward the corner of the removable portion 320; actuator 326 may simply be gripped and pulled in a direction opposite the corner of its location on the removable portion 320, as shown in FIG. 13.

Referring now to FIGS. 1-13, embodiments of a method of creating an opening 35 in a configurable enclosure 100 may include the steps of providing an enclosure 100 having a cover portion 40 operably attached to a base portion 10, the base portion 10 including a wall 12 disposed around a perimeter of a bottom surface 11, disposing a track 25 on the bottom surface 11 of the base portion 10, the track 25 substantially surrounding a removable portion 20 of the bottom surface 11, and reducing a thickness of the bottom surface 11 proximate an outer edge of the removable portion 20, wherein the track 25 is configured to be peeled away from the bottom surface 11 to release the removable portion 20 and create an opening 35 in the base portion 10.

Moreover, embodiments of a method of creating an opening 235, 335 in a configurable enclosure 200, 300 may include the steps of providing an enclosure 200, 300 having a cover portion 240, 340 operably attached to a base portion 210, 310, the base portion 210, 310 including a wall 212, 312 disposed around a perimeter of a bottom surface 211, 311, disposing an actuator 226, 326 on a removable portion 220, 320 of the bottom surface 211, 311 of the base portion 210, 310, and reducing a thickness of the bottom surface 211, 311 proximate an outer edge of the removable portion 220, 320, wherein the actuator 226, 326 is configured to be pulled to peel away the removable portion 220, 320 and create an opening 235, 335 in the base portion 210, 310.

While this disclosure has been described in conjunction with the specific embodiments outlined above, it is evident that many alternatives, modifications and variations will be apparent to those skilled in the art. For instance, those having skill in the requisite art should appreciate that various structural configurations and processes may be implemented to allow a portion of the bottom surface 11, 211, 311 to peel away from the base portion 10, 210, 310. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The following is claimed:

1. A configurable enclosure for housing broadband equipment, the configurable enclosure comprising:
   a cover portion operably attached to a base portion, the base portion including a wall disposed along a perimeter of a bottom surface of the base portion, the cover portion being configured to physically cover an interior of the configurable enclosure in a closed position so as to prevent unauthorized access to the interior;
   at least one connector configured to operably attach the cover portion to the base portion;
   a removable portion of the bottom surface configured to be located in the interior of the configurable enclosure and released from the base portion;
   a pull tab positioned on the removable portion within a perimeter of the removable portion; and
   a track surrounding the removable portion,
   wherein through actuation of the pull tab, the removable portion and the track are separable from the base portion to release the removable portion to create an opening on the base portion,
   wherein the removable portion, the track, and a first portion of the bottom surface of the base portion surrounding the track are structurally integrated by at least one second portion of the base portion, the second portion being thinner than at least one of the removable portion and the first portion.

2. The configurable enclosure of claim 1, wherein the base portion includes a plurality of openings located on the wall of the base portion proximate a first side.

3. The configurable enclosure of claim 1, wherein the base portion comprises at least one mounting region configured to be mounted to a structure.

4. The configurable enclosure of claim 1, wherein the configurable enclosure is a cable box shield.

5. The configurable enclosure of claim 1, wherein the track is configured to be located in the interior of the enclosure in the closed position.

6. The configurable enclosure of claim 1, wherein the configurable enclosure is configured to be mounted over cable TV equipment.

7. A configurable enclosure for housing broadband equipment, the configurable enclosure comprising:
   a cover portion operably attached to a base portion, the base portion including a wall disposed along a perimeter of a bottom surface of the base portion, the cover portion being configured to physically cover an interior of the configurable enclosure in a closed position so as to prevent unauthorized access to the interior;
   at least one connector configured to operably attach the cover portion to the base portion;
   a removable portion of the bottom surface configured to be located in the interior of the configurable enclosure and released from the base portion;
   a pull tab positioned on a track, the track surrounding the removable portion, wherein through actuation of the pull tab, the track is separable from the base portion to release the removable portion to create an opening on the base portion; and
   a lock cooperating structure configured to cooperate with a lock to facilitate securing the configurable enclosure in the closed position to prevent unauthorized access to the interior,
   wherein the removable portion, the track, and a first portion of the bottom surface of the base portion surrounding the track are structurally integrated by at least one second portion of the base portion, the second portion being thinner than at least one of the removable portion and the first.

8. The configurable enclosure of claim 7, wherein the lock cooperating structure comprises a structure selected from the group consisting of: (a) a protrusion of the cover portion, the protrusion defining a lock receiving opening configured to receive part of a lock device; and (b) a plurality of protrusions of the cover portion and base portion, the protrusions, when engaged with each other, defining at least one lock receiver configured to receive part of a lock device.

9. The configurable enclosure of claim 1, wherein the cover portion is configured to block removal of the broadband equipment through the cover portion.

10. The configurable enclosure of claim 1, wherein the cover portion is configured to completely cover the interior when the configurable enclosure is closed.

11. The configurable enclosure of claim 1, wherein the pull tab is configured to be disposed in the interior of the configurable enclosure.

12. An apparatus comprising:
an enclosure configured to house cable TV equipment, the enclosure having a cover operably attached to a base, the base including a wall disposed around a perimeter of a bottom surface, wherein the cover completely covers an interior of the enclosure in a closed position; and
at least one coupler configured to operably couple the cover to the base,
wherein the bottom surface includes a removable portion, a first portion, and a second portion, the first portion extending about a perimeter of the removable portion between the removable portion and the second portion, the first portion being thinner than at least one of the removable portion and a second portion of the bottom surface,
wherein the removable portion includes an actuator attached to the removable portion within the perimeter of the removable portion,
wherein, the removable portion is separable from the second portion of the bottom surface at the first portion of the bottom surface,
wherein, when the removable portion is separated from the second portion of the bottom surface, the removable portion is released from the base thereby creating an opening in the bottom surface of the base, and
wherein the enclosure is configured to be mounted over cable TV equipment on a structure at a location where the cable TV equipment is also located on the structure.

13. The apparatus of claim 12, wherein the actuator is configured to initiate separation of the removable portion from the second portion of the bottom surface.

14. The apparatus of claim 12, wherein the actuator is configured to facilitate separation of the removable portion from the second portion of the bottom surface after the separation of the removable portion from the second portion of the bottom surface is initiated.

15. The apparatus of claim 12, wherein at least one of the cover and the base comprises a lock enabling member configured to facilitate securing the configurable enclosure in the closed position to prevent unauthorized access to the interior.

16. The apparatus of claim 12, wherein the bottom surface comprises at least one mounting region configured to be mounted to the structure.

17. The apparatus of claim 16, wherein the at least one mounting region is configured to receive a fastener that penetrates through the bottom surface.

18. The apparatus of claim 12, wherein the actuator is configured to facilitate gripping and removal of the removable portion from the second portion of the bottom surface.

19. The apparatus of claim 12, wherein the actuator is a pull tab.

20. The apparatus of claim 12, further comprising:
a plurality of openings disposed on the wall of the base to allow entrance into the enclosure when in the closed position.

21. The apparatus of claim 12, wherein the enclosure is a cable box shield.

22. The apparatus of claim 12, wherein the actuator remains attached to removable portion after the removable portion is completely separated from the second portion of the bottom surface.

23. The apparatus of claim 12, further comprising a track extending about the periphery of the removable portion, wherein the track is separable from the base portion with the removable portion.

24. A configurable enclosure for housing broadband equipment, the configurable enclosure comprising:
a cover operably attached to a base, the base including a wall disposed along a perimeter of a bottom surface of the base, the cover being configured to physically cover an interior of the configurable enclosure in a closed position so as to prevent unauthorized access to the interior;
at least one connector configured to operably attach the cover to the base;
a removable portion of the bottom surface configured to be located in the interior of the configurable enclosure and releasable from the base; and
an actuator attached to the removable portion within a perimeter of the removable portion,
wherein the removable portion and a first portion of the bottom surface of the base surrounding the removable portion are structurally integrated by a second portion of the bottom surface, the second portion of the bottom surface being thinner than at least one of the removable portion and the first portion of the bottom surface,
wherein the removable portion is separable from the first portion of the bottom surface at the second portion of the bottom surface to release the removable portion to create an opening on the base, and
wherein the base comprises at least one mounting region configured to be mounted to a structure.

25. The configurable enclosure of claim 24, wherein the actuator is configured to initiate separation of the removable portion from the first portion of the bottom surface.

26. The configurable enclosure of claim 24, wherein the actuator is configured to facilitate separation of the removable portion from the first portion of the bottom surface after the separation of the removable portion from the first portion of the bottom surface is initiated.

27. The configurable enclosure of claim 24, wherein the at least one mounting region is configured to receive a fastener that penetrates through the bottom surface.

28. The configurable enclosure of claim 24, wherein the actuator remains attached to removable portion after the removable portion is completely separated from the second portion of the bottom surface.

29. The configurable enclosure of claim 24, wherein the actuator is configured to facilitate gripping and removal of the removable portion.

30. The configurable enclosure of claim 24, wherein the actuator is a pull tab.

31. The configurable enclosure of claim 24, further comprising:
a plurality of openings disposed on the wall of the base to allow entrance into the enclosure when in the closed position.

32. The configurable enclosure of claim 24, wherein the enclosure is a cable box shield.

33. The configurable enclosure of claim 24, further comprising a track extending about the periphery of the removable portion, wherein the track is separable from the base portion with the removable portion.

* * * * *